June 4, 1929.    B. R. BRIGHT    1,716,338
MOTOR OIL COOLER AND SEPARATOR
Filed Dec. 6, 1927
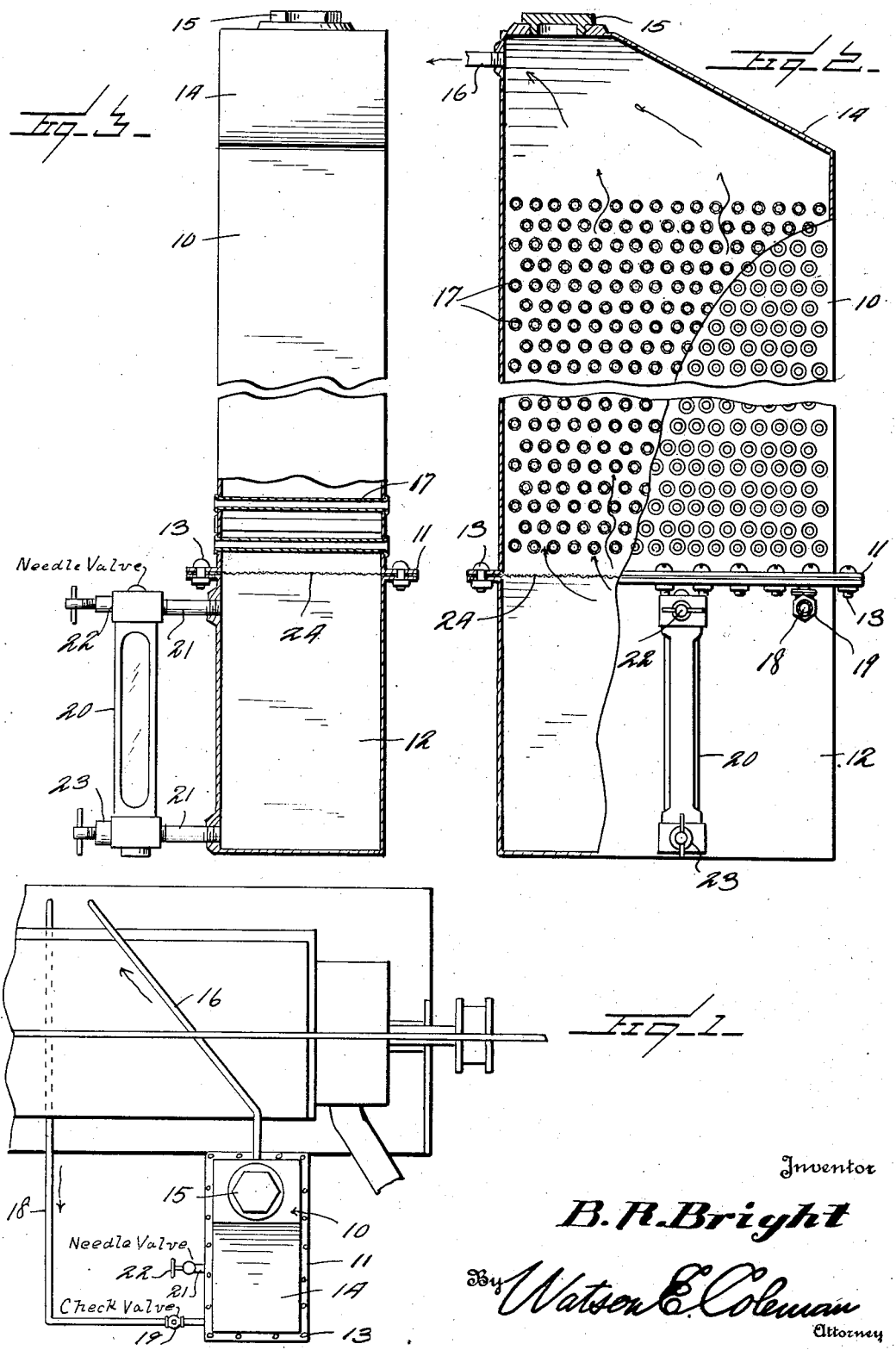
Inventor
B. R. Bright
By Watson E. Coleman
Attorney Patented June 4, 1929.

1,716,338

UNITED STATES PATENT OFFICE.

BARTON R. BRIGHT, OF EL DORADO, ARKANSAS, ASSIGNOR OF TWENTY-FOUR PER CENT TO J. E. CATLIN, AND TWENTY-FIVE PER CENT TO N. E. HENDRICKSON.

MOTOR-OIL COOLER AND SEPARATOR.

Application filed December 6, 1927. Serial No. 238,137.

This invention relates to means for settling or separating sediment and burned motor-oil from good oil, and the general object of the invention is to provide an oil separator and cooler of a very simple construction which may be applied to a motor car having the ordinary oil pump and which is so formed that it may be installed back of the radiator and fan on either side of the motor.

A further object is to provide a device of this character having a sediment tank or pan at the lower end into which the used oil is pumped from the oil pump, the sediment pan having a screen at the upper end through which the oil passes into a cooling chamber, the cooling chamber being intersected by a large number of air pipes or flues which extend through the chamber and open at their ends to the outside air and the oil then flows to the bearings of the car.

A further object is to provide a sediment pan which is removable, and provide the sediment pan with a gauge glass and means whereby the gauge glass may be cut off from the sediment pan in case the gauge glass should become broken.

Other objects will appear in the course of the following description.

My invention is illustrated in the accompanying drawing, wherein:—

Figure 1 is a top plan view of the engine of a motor vehicle with my separator and cooler applied thereto;

Figure 2 is an elevation partly in section of the separator and cooler;

Figure 3 is an end elevation partly in section.

Referring to this drawing, 10 designates a vertically extending casing which is rectangular in plan and constitutes a cooling chamber. The lower end of this casing is flanged, as at 11, and attached to the lower end of the casing is a sediment tank or relatively deep pan 12 also formed with flanges confronting the flanges 11 and engaged therewith by the stove bolts 13. Thus the sediment pan may be removed whenever desired. The chamber 10 at its upper end is upwardly inclined, as at 14, and provided with a filling cap 15 and an oil line 16 leading to the bearings of the car. Passing transversely across the chamber in parallel relation and opening upon the side faces of the chamber are a plurality of air pipes 17, these pipes being open upon the outer face of the chamber so that atmospheric air can flow through the pipes.

An oil line 8 enters the upper portion of the sediment pan, this oil pipe being provided with a check valve, the casing of which is designated 19. This oil pipe leads from the oil pump of the motor. The sediment pan is also provided with the gauge glass 20, the upper and lower ends of which are connected to the sediment pan by pipe sections 21, the upper pipe section being provided with a needle valve 22 and the lower pipe section with a drain cock 23.

It will be seen from Figure 2 that the cooler and separator is rectangular in plan, as before stated, and is relatively narrow and relatively high. This permits the separator to be disposed, as shown in Figure 1, to one side of the motor block with the narrow side of the cooler and separator against the motor and thus the cooler and separator may be bolted onto the motor head and onto the frame. The cooler and separator will be made in different sizes for different size cars.

The discharge line 18 from the oil pump is connected to the sediment pan at the top of the pan. The pressure from the oil pump causes the oil to flow upward through a separating screen 24 and then upward through the cooling chamber 10 to the oil line 16 and thence to the bearings of the motor. As the oil reaches the sediment pan, its speed of flow is greatly reduced, though the pressure with which the oil is put through the cooler and separator is practically the same. The oil moves slowly upward through the separating screen, which thus separates any sediment which may come in from the crank case, and this sediment settles in the lower portion of the pan 12, while the oil flows upward around the air flues 17 in the cooling chamber. These air flues are disposed parallel to the engine block and thus the air set in motion by the motor fan and by the speed of the car is driven through the air flues around which the oil is moving, thus giving a very large cooling area for the oil which is thoroughly cooled by the time it reaches the top of the cooler and flows back to the working parts of the motor under practically the same pressure and speed with which it enters the cooler. The burned oil will also collect within the sediment pan and the gauge glass 20 will show at all times the amount of sediment or burned oil in the sediment pan. This refuse oil may be drained by means of the drain cock 23 and after the oil has been drained from the sediment pan it is advisable to refill the cooler through the filling cap 15 with the same amount of oil as was withdrawn.

The check valve 19 is for the purpose of checking the gravity flow of oil from the cooler back to the crank case when the motor and oil pump are not operating. The gauge glass may be at any time cut off from the cooler by means of the needle valves 22 and 23. This prevents losing oil if the gauge glass should be broken. In the event it becomes necessary to clean the separating screen 24, the bolts 13 may be removed and the sediment pan separated from the cooling chamber.

The construction which I have described will deliver to the bearings and cylinders of the motor clean and cool oil which has greater lubricating qualities than the hot, dirty oil used in the crank case systems of lubrication. The cool, clean oil prevents wear and burning of the cylinders, prolongs the life of the motor, and eliminates the repairs of motors, making the operation more economical and securing a great saving in the motor oil.

I claim:—

1. An oil cooler and separator for motor cars including a settling sediment collecting tank, a cooling chamber disposed above the tank, a screen between the tank and the cooling chamber, the cooling chamber having air pipes extending therethrough and the inlet pipe having a check valve entering the upper portion of the settling and sediment tank, and an outlet pipe leading from the top of the cooling chamber.

2. An oil cooler and separator for motor cars comprising a sediment collecting settling tank and a vertically elongated chamber disposed upon and removably engaged with the top of the settling tank, and having a filling opening at its upper end, the cooling chamber being intersected by a plurality of transversely extending parallel pipes opening upon the exterior faces of the cooling chamber, an oil inlet pipe entering the sediment tank adjacent its top and adapted to be connected to the oil pump of the automobile, a screen disposed between the settling tank and the cooling chamber, an oil outlet leading from the upper portion of the cooling chamber, and a drain cock leading from the bottom of the sediment tank.

3. An oil cooler and separator for motor cars comprising a sediment collecting settling tank and a vertically elongated chamber disposed upon and removably engaged with the top of the settling tank and having a filling opening at its upper end, the cooling chamber being intersected by a plurality of transversely extending parallel pipes opening upon the exterior faces of the cooling chamber, an oil inlet pipe entering the sediment tank adjacent its top and adapted to be connected to the oil pump of the automobile, a screen disposed between the settling tank and the cooling chamber, an oil outlet leading from the upper portion of the cooling chamber, a drain cock leading from the bottom of the sediment tank, a gauge glass associated with the sediment tank, the drain cock forming a connection between the lower end of the gauge glass and the lower end of the sediment tank, and a needle valve controlling the flow of oil from the upper portion of the sediment tank into the upper portion of the gauge glass.

4. An oil cooler and separator for motor cars comprising a combined sediment collecting and cooling tank, a plurality of transversely extending, parallel cooling pipes opening upon the exterior face of the tank and disposed above the bottom thereof, an oil inlet pipe entering said tank below the cooling pipes but above the bottom of the tank and adapted to be connected to the oil pipe of an automobile, a screen disposed across the tank below the cooling pipes, and an oil outlet leading from the upper portion of the tank.

In testimony whereof I hereunto affix my signature.

BARTON R. BRIGHT.